No. 697,864.  
I. METZGER.  
JOURNAL BEARING.  
(Application filed Sept. 1, 1900.)  
Patented Apr. 15, 1902.
(No Model.)
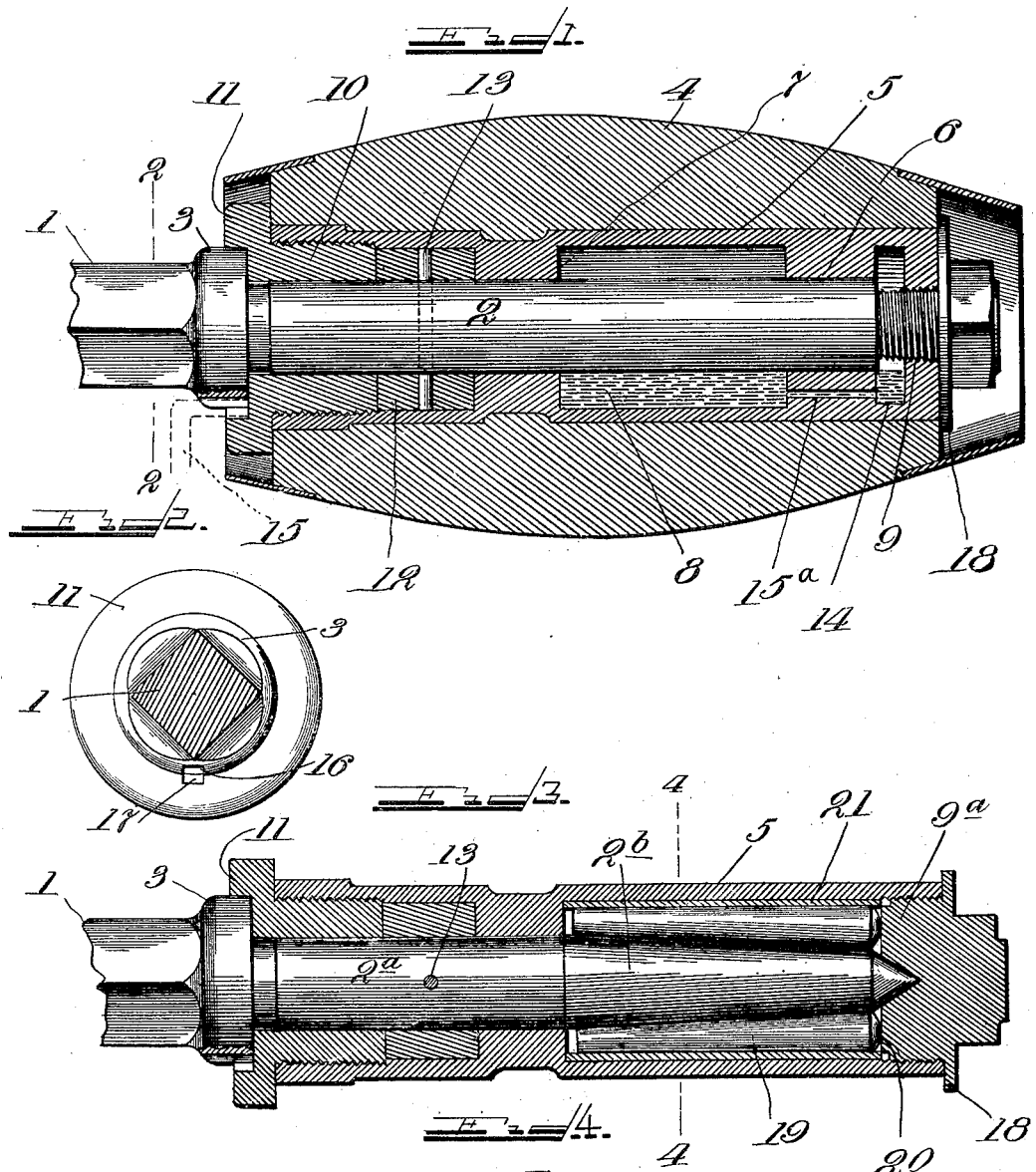

UNITED STATES PATENT OFFICE.

ISBON METZGER, OF WINFIELD, IOWA.

JOURNAL-BEARING.

SPECIFICATION forming part of Letters Patent No. 697,864, dated April 15, 1902.

Application filed September 1, 1900. Serial No. 28,727. (No model.)

*To all whom it may concern:*

Be it known that I, ISBON METZGER, a citizen of the United States, residing at Winfield, in the county of Louisa and State of Iowa, have invented new and useful Improvements in Journal-Bearings, of which the following is a full, clear, and exact specification.

My invention relates more particularly to journal-bearings for vehicles, and has for its primary object to provide an improved form of bearing which shall be capable of having a large supply of oil or lubricant sealed therein proof against dirt and dust, a further object being to make the device of such construction that antifriction-rollers may be employed, if desired.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

In the said drawings, Figure 1 is a vertical longitudinal sectional view of my improved journal-bearing applied to the spindle and hub of a vehicle. Fig. 2 is a transverse sectional view taken on the line 2 2 of Fig. 1. Fig. 3 is a longitudinal sectional view of my improved bearing, illustrating a modification hereinafter described; and Fig. 4 is a transverse section taken on the line 4 4 of Fig. 3.

1 represents the axle, and 2 the axle-spindle, which may be of the usual or any suitable construction, but preferably one which is provided with a shoulder 3 at the inner end.

4 represents a hub in which is forced a box 5, provided with at least two points of bearing on the spindle 2. In the particular example shown in the drawings I provide the box 5 with three points of bearing. The first of these is shown at 6 and is constituted by a contraction of the box around the spindle, the second, at 7, constituted by a similar contraction located at a considerable distance from the contraction or bearing-point 6, so as to leave between a large oil cavity or chamber 8, which may be filled with oil or other suitable lubricant through the end of the box 5, the latter being provided with an aperture closed by a screw-plug 9, which abuts against the end of the spindle 2 and also serves as an end-thrust bearing. The third point of bearing of the box 5 on the spindle is constituted by a bushing 10, which is screw-threaded in the rear end of the box and has a large flange 11, into which the shoulder 3 is embedded for the purpose of guarding against the admission of grit to the spindle between the contacting surfaces of the bushing and the spindle. The principal function of this bushing 10, however, is to hold the hub on the spindle, which it does by resistance against a collar 12, screwed to the spindle 2, preferably by detachable means, such as a dowel-pin 13 passing through the collar and spindle, said collar being situated between the inner end of the bushing and the contraction 7, and also of sufficient diameter to constitute a part of the bearing of the spindle against the inner surface of the box 5. By this means it will be seen that when the bushing 11 is screwed home it will firmly abut against the collar 12, and the collar 12 being abutted against the contraction 7 the hub will be securely fastened on the spindle even in the absence of the end-thrust bearing 9 or the usual retaining-nut placed on the end of spindles of ordinary construction. It is of course obvious that packing-rings may be inserted wherever desired between the parts to further guard against the admission of dirt and the escape of oil.

The contraction 6, forming the point of bearing at the outer end of the spindle, is cut away to form a supplemental oil-cavity 14, and this cavity is connected by a bottom duct 15 with the main cavity 8, so that when the plug 9 is removed the point of the oil-can may be inserted in the cavity 14 and the cavity 8 thereby filled without removing the hub from the axle. Should it be desired, however, to remove the wheel for any purpose, the object may be accomplished by inserting a key 15 (shown in dotted lines) in a socket 16 in the lower edge of the shoulder 3 and a registering socket 17 in the rear end of the bushing 10, and then by turning the wheel in the proper direction it will be seen that box 5 will be unscrewed from the bushing 10, which latter during the ordinary use of the wheel turns with the hub.

The flange 11 on the bushing 10 is carried outwardly a sufficient distance to overlap the end of the hub 4, and the plug 9 is provided with an enlarged flange 18, which overlaps the outer end of the hub, and by these two flanges it will be seen that box 5 may be securely held in place in the hub without the aid of other means.

In the form of my invention shown in Figs. 3 and 4 the contraction 6 and oil-cavity 14 are omitted, and the outer end of the spindle $2^a$ is given a conical formation $2^b$, and the extreme end of this conical portion $2^b$ is pointed and fitted into a bearing of complementary shape in a plug $9^a$, screwed into the outer end of the box 5, and is preferably of equal diameter with the cavity surrounding the conical portion $2^b$, so that a number of antifriction-rollers 19 may be introduced into the box for constituting a bearing for the spindle. The outer ends of the conical rollers 19 are preferably rounded, as shown at 20, and abut against plug $9^a$, so that by the adjustment of the plug $9^a$ the pressure of the rollers 19 against the spindle may be regulated as desired. If necessary, a bushing 21 may be introduced into the box as a race for the rollers 19 to run in.

Having thus described my invention, what I claim as new therein, and desire to secure by Letters Patent, is—

1. In a journal-bearing, the combination of a spindle; a box having an enlarged oil-chamber and two points of bearing against said spindle; and a collar secured to said spindle between said points of bearing; substantially as set forth.

2. In a journal-bearing, the combination of a spindle; a box contracted around said spindle at one point and having an enlarged oil-cavity surrounding said spindle at another point; a collar secured to said spindle and abutting against said contraction; and a bushing threaded in said box and abutting against said collar; substantially as set forth.

3. In a journal-bearing, the combination of a spindle; a box contracted around said spindle at one point and having an enlarged oil-cavity surrounding said spindle at another point; a collar detachably secured to said spindle and abutting against said contraction, and also bearing at its periphery against said box; and a bushing threaded in said box and abutted against said collar; substantially as set forth.

4. In a journal-bearing, the combination of a spindle having the shoulder 3; a collar secured on said spindle at a distance from said shoulder; a bushing secured between said shoulder and collar; a box inserted over said spindle and collar and threaded on said bushing and having a contraction abutting against the end of said collar remote from said bushing, the outer end of said box being closed around the end of said spindle and having an oil-cavity surrounding said spindle; substantially as described.

5. In a journal-bearing, the combination of a spindle having the shoulder 3; a collar secured on said spindle at a distance from said shoulder; a bushing located on said spindle between said shoulder and collar; a box closed at its outer end and inserted over said spindle and collar and threaded on said bushing; a hub inserted over said box; the flange 11 on said bushing abutting against the inner end of said hub; and a screw-plug in the outer end of said box, having an enlarged flange 18 also overlapping and abutting against the outer end of said hub; substantially as set forth.

ISBON METZGER.

Witnesses:
B. B. LINDLY,
J. M. LINDLY.